US011114976B2

United States Patent
Pao (10) Patent No.: US 11,114,976 B2
(45) Date of Patent: Sep. 7, 2021

(54) MODULAR REMOVABLE BUILDING INTEGRATED THERMAL ELECTRIC ROOFING SYSTEM

(71) Applicant: Frank Pao, Boston, MA (US)

(72) Inventor: Frank Pao, Boston, MA (US)

( * ) Notice: Subject to any disclaimer, the term of this patent is extended or adjusted under 35 U.S.C. 154(b) by 0 days.

(21) Appl. No.: 15/874,392

(22) Filed: Jan. 18, 2018

(65) Prior Publication Data

US 2019/0222172 A1    Jul. 18, 2019

(51) Int. Cl.

| | | |
|---|---|---|
| *E04D 1/34* | (2006.01) | |
| *H02S 40/44* | (2014.01) | |
| *H02S 40/32* | (2014.01) | |
| *E04D 12/00* | (2006.01) | |
| *H02S 20/25* | (2014.01) | |
| *F24S 20/67* | (2018.01) | |
| *F24S 80/20* | (2018.01) | |
| *F24S 80/10* | (2018.01) | |
| *F24S 25/30* | (2018.01) | |
| *H02S 40/36* | (2014.01) | |

(52) U.S. Cl.
CPC ............ *H02S 40/44* (2014.12); *E04D 12/004* (2013.01); *F24S 20/67* (2018.05); *F24S 25/30* (2018.05); *F24S 80/10* (2018.05); *F24S 80/20* (2018.05); *H02S 20/25* (2014.12); *H02S 40/32* (2014.12); *H02S 40/36* (2014.12)

(58) Field of Classification Search
CPC ........ Y02B 10/12; Y02B 10/20; Y02B 10/70; H02S 20/23; H02S 20/25; H02S 40/44; Y02E 10/44; E04D 2001/3458; E04D 1/34; E04D 2001/3411; E04D 2001/3473; E04D 1/14; E04F 13/0816; E04F 13/083; E04F 13/0803; E04F 13/0835
See application file for complete search history.

(56) References Cited

U.S. PATENT DOCUMENTS

| | | | | |
|---|---|---|---|---|
| 3,117,353 A * | 1/1964 | Edwards | ............ | E04F 13/0835 |
| | | | | 403/403 |
| D542,631 S * | 5/2007 | Munson | ........................ | D8/373 |
| 7,444,792 B2 * | 11/2008 | Matson | ................... | E04D 12/00 |
| | | | | 24/336 |
| 8,196,369 B2 * | 6/2012 | Pao | ..................... | F24D 17/0015 |
| | | | | 52/173.3 |
| 8,201,382 B1 * | 6/2012 | Pao | .......................... | F24J 2/045 |
| | | | | 52/173.3 |
| 8,215,070 B2 * | 7/2012 | Railkar | ................. | E04D 12/004 |
| | | | | 52/173.3 |
| 8,782,972 B2 * | 7/2014 | Grieco | .................... | H02S 20/24 |
| | | | | 52/173.3 |
| 9,097,021 B1 * | 8/2015 | Williams | ................ | E04D 1/365 |
| 10,323,412 B2 * | 6/2019 | Koziol | ................. | E04F 13/081 |
| 2004/0000334 A1 * | 1/2004 | Ressler | ................. | F24J 2/5211 |
| | | | | 136/251 |
| 2012/0260977 A1 * | 10/2012 | Stancel | ................ | F24S 25/613 |
| | | | | 136/251 |
| 2013/0269756 A1 * | 10/2013 | Pao | ..................... | H01L 31/0483 |
| | | | | 136/248 |
| 2014/0237930 A1 * | 8/2014 | Fu | ............................ | E04D 1/34 |
| | | | | 52/551 |

* cited by examiner

*Primary Examiner* — Brian E Glessner
*Assistant Examiner* — Daniel J Kenny
(74) *Attorney, Agent, or Firm* — North Shore Patents, P.C.

(57) ABSTRACT

An improved modular, removable system of building-integrated solar panel photovoltaics for easy residential and commercial roof installation for generating electrical and thermal energy.

19 Claims, 11 Drawing Sheets

MODULAR REMOVABLE BUILDING INTEGRATED THERMAL ELECTRIC ROOFING SYSTEM

FIELD OF THE INVENTION

This invention relates to an improved system of modular building-integrated photovoltaics for easy residential and commercial roof installation for generating electrical and thermal energy.

BACKGROUND OF INVENTION

Global warming, access to reliable, clean, renewable energy, and worldwide energy shortages are growing problems. The increased usage and efficiency of solar panels can be used worldwide to capture greater amounts of solar energy to solve these problems. Solar panels containing solar cells for generating thermal and electrical energy from solar energy and are well known in the art and in wide spread use.

However, due to their structure, conventional solar panels are typically large and heavy. These solar panels contain large arrays of photovoltaic silicon cells for converting solar energy directly to electricity, and hydraulic circuits below the photovoltaic cell and in thermal contact therewith. These hydraulic circuits convert part of the solar energy absorbed into domestic hot water supplies and heat for indoor spaces. This heavy structure makes it expensive to move and mount solar panels, reducing their availability to many structures worldwide.

Therefore, there is a need for a system of modular solar panels, that are cheaper to move and install. The present invention accomplishes these objectives.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a modular, removable roofing installation system for optimally capturing solar thermal energy, the modular, removable roofing installation system comprising: a plurality of removable solar panel modules, each solar panel module comprising a plurality of slate modules mounted on a plurality of metal battens, a plurality of inverters for converting DC electricity fed from the plurality of slate modules to AC electricity, a thermal tubing containing liquid mounted beneath the plurality of slate modules on the plurality of metal battens, wherein the plurality of metal battens are mounted on a plurality of horizontal battens that mounted onto a plurality of vertical battens, wherein the bottom side of the plurality of vertical battens contains at least one latch for removably attaching each solar panel module to a corresponding latch on a roof; a pump and thermal control unit comprising a circulation pump that is operatively connected to the thermal tubing for circulating the liquid through the thermal tubing, a heat exchanger that is operatively connected to the thermal tubing for extracting the thermal energy, the heat exchanger being housed in a storage tank; a heat pump connected to the heat exchanger for maintaining the temperature of the liquid in the storage tank to a certain threshold temperature; whereby the plurality of slate modules and the thermal tubing operate simultaneously to generate electricity and domestic hot water respectively; and wherein the system may be removed and re-installed on a second roof by disconnecting the pump and thermal control unit, disconnecting the thermal tubing from the heat exchanger and the circulation pump, and removing the plurality of removable solar panel modules off the latches.

The subject invention discloses a modular, removable roofing installation system for optimally capturing solar thermal energy, the modular, removable roofing installation system comprising: a plurality of removable solar panel modules, each solar panel module comprising a plurality of slate modules mounted on a plurality of metal fasteners, a plurality of inverters for converting DC electricity fed from the plurality of slate modules to AC electricity, a thermal tubing containing liquid mounted beneath the plurality of slate modules on the plurality of metal fasteners, wherein the plurality of metal fasteners removably attach each solar panel module to a roof; a thermal control unit comprising a liquid circulation pump that is operatively connected and in fluid communication with the thermal tubing for circulating the liquid through the thermal tubing, wherein the thermal control unit is placed within an attic or basement; a heat exchanger that is operatively connected to the thermal tubing for extracting the captured solar thermal energy; the heat exchanger being housed in a storage tank that maintains the temperature of the liquid in the storage tank at a threshold temperature, wherein the storage tank is placed within the attic or basement; whereby the plurality of slate modules and the thermal tubing operate simultaneously to generate DC electricity and domestic hot water respectively, wherein the DC electricity is converted to AC electricity with the plurality of inverters; and wherein the system may be removed and re-installed onto a second roof by disconnecting the thermal control unit, disconnecting the thermal tubing from the heat exchanger and the circulation pump, and removing the plurality of removable solar panel modules off the roof.

The subject invention discloses a modular roofing system for optimally capturing solar thermal energy, the modular roofing system comprising: a plurality of removable solar panel modules, each solar panel module comprising a plurality of slate modules mounted on a plurality of metal fasteners; a plurality of inverters for converting DC electricity generated by the plurality of slate modules into AC electricity; a thermal tubing containing liquid mounted beneath the plurality of slate modules on the plurality of metal fasteners; wherein the plurality of metal fasteners removably attach each solar panel module to a roof; a liquid circulation pump operatively connected and in fluid communication with the thermal tubing for circulating the liquid through the thermal tubing, wherein the circulation pump is placed within an attic or basement; a heat exchanger operatively connected to the thermal tubing for extracting captured solar thermal energy; a storage tank for maintaining the temperature of the liquid; whereby the plurality of slate modules and the thermal tubing operate simultaneously to generate DC electricity and domestic hot water respectively, wherein the DC electricity is converted to AC electricity with the plurality of inverters; and wherein the system may be removed and re-installed onto a second roof by disconnecting the thermal tubing from the heat exchanger and the circulation pump, and removing the plurality of removable solar panel modules off the roof.

The subject invention discloses a modular, removable roofing installation system for optimally capturing solar thermal energy, the modular, removable roofing installation system comprising: a plurality of removable solar panel modules, each solar panel module comprising a plurality of slate modules mounted on a plurality of fasteners, wherein the plurality of fasteners removably attach each solar panel module to a roof; a thermal tubing containing liquid mounted beneath the plurality of slate modules; a thermal pump control unit operatively connected and in fluid communication with the thermal tubing for circulating the liquid through the thermal tubing; a heat exchanger operatively connected to the thermal tubing for extracting the thermal energy; whereby the plurality of slate modules and the thermal tubing operate simultaneously to generate DC electricity; a DC to AC electricity converter to generate AC electricity from the generated DC electricity; and wherein the system may be removed and re-installed on a second roof by disconnecting the thermal pump control unit, disconnecting the thermal tubing from the heat exchanger and the thermal pump control un, and removing the plurality of removable solar panel modules off the roof.

The subject invention also discloses a method of installing a modular, removable roofing installation system comprising: a. removably mounting a plurality of removable solar panel modules on a roof, each solar panel module comprising a plurality of slate modules mounted on a plurality of metal battens, a plurality of inverters for converting DC electricity fed from the plurality of slate modules to AC electricity, a thermal tubing containing liquid mounted beneath the plurality of slate modules on the plurality of metal battens, wherein the plurality of metal battens are mounted on a plurality of horizontal battens that mounted onto a plurality of vertical battens, wherein the bottom side of the plurality of vertical battens contains plywood or fiberglass backing with at least one latch for removably attaching each solar panel module to a corresponding latch on a roof; b. mounting a pump and thermal control unit comprising a circulation pump proximate to the solar panel modules; c. connecting the circulation pump to the thermal tubing for circulating the liquid through the thermal tubing; d. connecting a heat exchanger to the thermal tubing for extracting the thermal energy, the heat exchanger being housed in a storage tank; e. connecting a heat pump to the heat exchanger for maintaining the temperature of the liquid in the storage tank to a certain threshold temperature; f. electrically connecting each of the plurality of slate modules in series to form a string; and g. connecting the plurality of inverters to each string for converting the DC electricity from the plurality of slate modules to AC electricity.

The subject invention also discloses a method of installing a modular, removable roofing installation system comprising: a. removably mounting a plurality of removable solar panel modules on a roof, each solar panel module comprising a plurality of slate modules mounted on a plurality of metal fasteners, a plurality of inverters for converting DC electricity fed from the plurality of slate modules to AC electricity, a thermal tubing containing liquid mounted beneath the plurality of slate modules on the plurality of metal fasteners, wherein the plurality of metal fasteners removably attach each solar panel module to a roof; b. mounting a thermal control unit comprising a circulation pump in the attic or basement; c. operatively connecting the circulation pump to the thermal tubing in fluid communication for circulating the liquid through the thermal tubing; d. connecting a heat exchanger to the thermal tubing for extracting the thermal energy, the heat exchanger being housed in a storage tank in the basement or attic; e. connecting a heat pump to the heat exchanger for maintaining the temperature of the liquid in the storage tank to a certain threshold temperature; f. electrically connecting each of the plurality of slate modules in series to form a string; and g. connecting the plurality of inverters to each string for converting the DC electricity from the plurality of slate modules to AC electricity.

The subject invention also discloses a method of installing a modular roofing installation system comprising: a. removably mounting a plurality of removable solar panel modules on a roof, each solar panel module comprising a plurality of slate modules mounted on a plurality of fasteners, a plurality of inverters for converting DC electricity fed from the plurality of slate modules to AC electricity, a thermal tubing containing liquid mounted beneath the plurality of slate modules on the plurality of fasteners, wherein the plurality of fasteners removably attach each solar panel module to a roof; b. mounting a thermal control unit comprising a circulation pump in the attic or basement; c. operatively connecting the circulation pump to the thermal tubing in fluid communication for circulating the liquid through the thermal tubing; d. connecting a heat exchanger to the thermal tubing for extracting the thermal energy, the heat exchanger being housed in a storage tank in the basement or attic; e. connecting a heat pump to the heat exchanger for maintaining the temperature of the liquid in the storage tank to a certain threshold temperature; f. electrically connecting each of the plurality of slate modules in series to form a string; and g. connecting the plurality of inverters to each string for converting the DC electricity from the plurality of slate modules to AC electricity.

In embodiments of the subject invention, each of the plurality of slate modules includes at least one photovoltaic cell.

In embodiments of the subject invention, each of the plurality of slate modules is electrically connected in series to form a string.

In embodiments of the subject invention, the plurality of inverters feed AC electricity to a utility grid.

In embodiments of the subject invention, the plurality of metal battens collects the solar energy, converts into thermal energy and delivers to the liquid running in the thermal tubing.

In embodiments of the subject invention, the circulation pump is powered by a separate photovoltaic panel.

In embodiments of the subject invention, the heat exchanger extracts the thermal energy from the liquid in the thermal tubing resulting in heating up the domestic water supply and providing domestic hot water.

In embodiments of the subject invention, thermal tubing may be made of material selected from a group consisting of: copper, aluminum or cross-linked polyethylene (PEX).

In embodiments of the subject invention, the liquid in the thermal tubing may be selected from a group consisting of: water and glycol.

In embodiments of the subject invention, the heat pump maintains the temperature of the liquid in the storage tank when the temperature goes below/above a certain level.

In embodiments of the subject invention, the horizontal and vertical battens may be composed from a material selected from a group consisting of: wood and fiberglass.

In embodiments of the subject invention, the plurality of slate modules is cooled as the thermal energy is extracted by the heat exchanger, thereby making the plurality of slate modules operate at high efficiency in converting the solar energy to DC electricity.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

In embodiments of the subject invention, the term "relatively" is defined as a comparison of a property, or the proportion of a property between two components.

There has thus been outlined, rather broadly, the more important features of the invention in order that the detailed description of an improved system for modular building-integrated photovoltaics (BIPV) for easy residential and commercial roof installation. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of embodiments of an improved system of modular building-integrated photovoltaics (BIPV) for easy residential and commercial roof installation, which description should be considered in conjunction with the accompanying drawings, in which.

DETAILED DESCRIPTION OF THE EMBODIMENTS

While several variations of the present invention have been illustrated by way of example in particular embodiments, it is apparent that further embodiments could be developed within the spirit and scope of the present invention, or the inventive concept of an improved system of modular building-integrated photovoltaics (BIPV) for easy residential and commercial roof installation. However, it is to be expressly understood that such modifications and adaptations are within the spirit and scope of the present invention, and are inclusive, but not limited to the following appended claims as set forth.

As illustrated in FIGS. 1-6, 10 and 11, the subject invention is a system 1 of modular building-integrated photovoltaics (BIPV) for easy residential and commercial roof installation. This system 1 is installed on and in the roof, attic, and basement spaces for optimally capturing solar energy and converting it to electrical and thermal energy. In embodiments of the subject invention, the modular BIPV products would be composed from Sunslates™ 33 and TallSlates™ 7 BITERS® (Building Integrated Thermal Electric Roofing System) products.

As illustrated in FIGS. 1-3, 10 and 11, the modular BITERS system 1 consists of three major units: A) a plurality of removable BITERS modules 2 which each consist of a photovoltaic system with pre-installed micro inverters 3 and a thermal collector 4 for installation on a roof; B) a Pump and Thermal Control System 5 for installation in an attic or basement space; and C) an energy storage tank 6 for installation in an attic or basement space next to the Pump and Thermal Control System 5.

Each removable BITERS module 2 consists of the Photovoltaic modules which generate the solar electric through a TallSlates™ system 7 or Sunslates system 33. Each TallSlates™ 7 or Sunslates system 33 includes at least one photovoltaic cell. Each removable BITERS module 2 would be around 0.5 to 1.5 kw in size. A ½ kilowatt would have ten (10) TallSlates™ 7 or Sunslates system 33 modules. The TallSlates™ 7 modules 33 are about 54 watts and the Sunslates system 33 modules are about 23 watts. The modular BITERS system 1 solar energy conversion efficiency ranges from 25% to 50%, or higher, subject to sunlight and geographic location.

Right beneath the TallSlates™ 7 or Sunslates system 33 modules, the thermal collector 4 is composed of thermal tubing 23 containing liquid, mounted on a plurality of metal battens 24. The thermal tubing 23 extends on a longitudinal channel 25 of each of the plurality of metal battens 24. The plurality of metal battens 24 is mounted horizontally onto the plurality of horizontal wooden battens 28, which are mounted on a plurality of vertical wooden battens 29. A plurality of link channel brackets 26 having a hook is fastened vertically between a pair of the plurality of metal battens 24 using a latch. The thermal tubing 23 loops through the removable BITERS module 2 from top to bottom. Each of the TallSlates™ 7 or Sunslates system 33 modules is electrically connected in series to form a string 27. The number of the plurality of TallSlates™ 7 or Sunslates system 33 modules in the string 27 may vary according to the roof design. The plurality of TallSlates™ 7 or Sunslates system 33 modules and the thermal tubing 23 operate simultaneously to generate electricity energy and domestic hot water (thermal energy) respectively.

Figure 5:
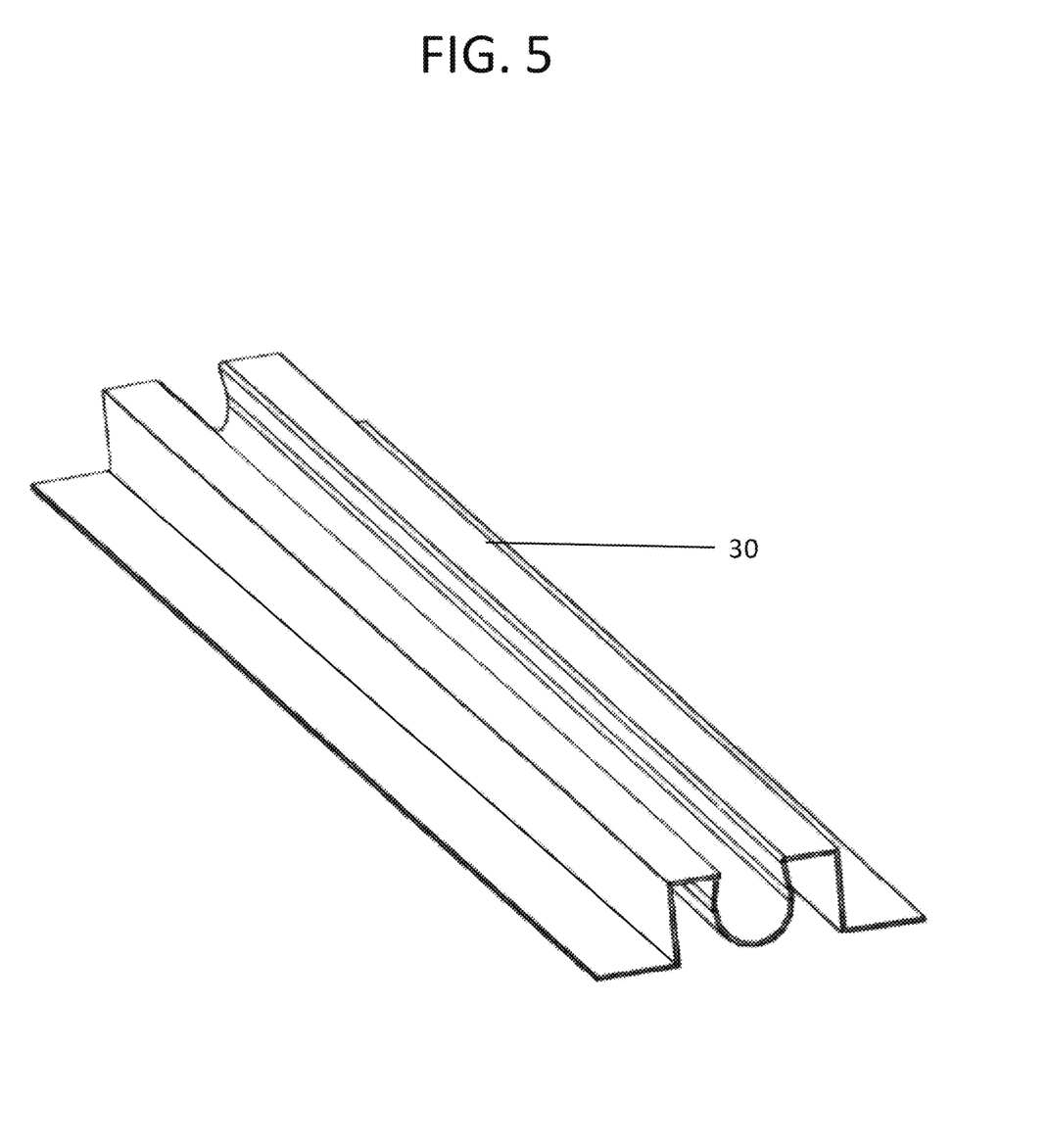
FIG. 5 illustrates a top isometric view of an attaching purlin.
Figure 6:
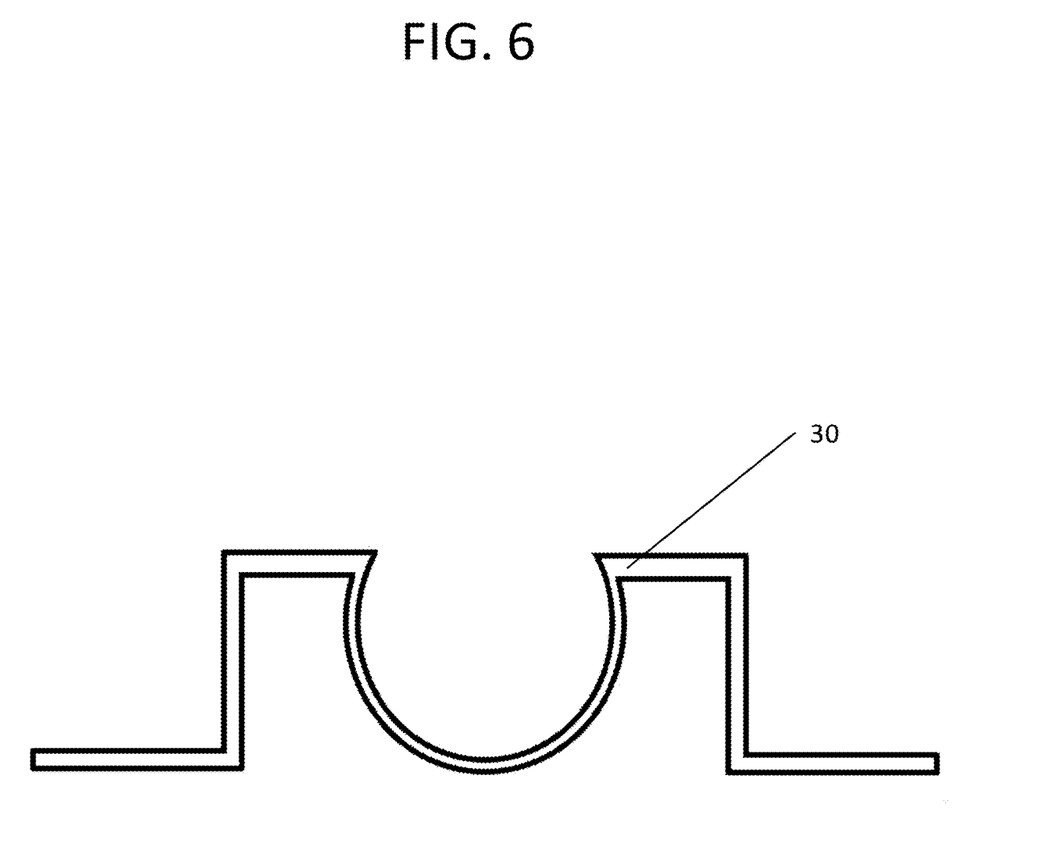
FIG. 6 illustrates a front view of an attaching purlin.

In other embodiments of the subject invention, the thermal system 4 could also use a plurality of purlins 30 to hold the thermal tubing 23 beneath the TallSlates™ 7 or Sunslates system 33. These purlins 30 would be mounted between the plurality of horizontal wooden batten 28. In a further embodiment, heat pipes could also be mounted vertically on the plurality of metal battens 24 as well as vertically on the plurality of purlins 30. In embodiments of the subject invention, the pluralities of horizontal 28 and vertical batten 29 holding the thermal collector 4 and the TallSlates™ 7 or Sunslates system 33 can be composed of wood or fiberglass, with fiberglass being the preferred material.

Figure 7:
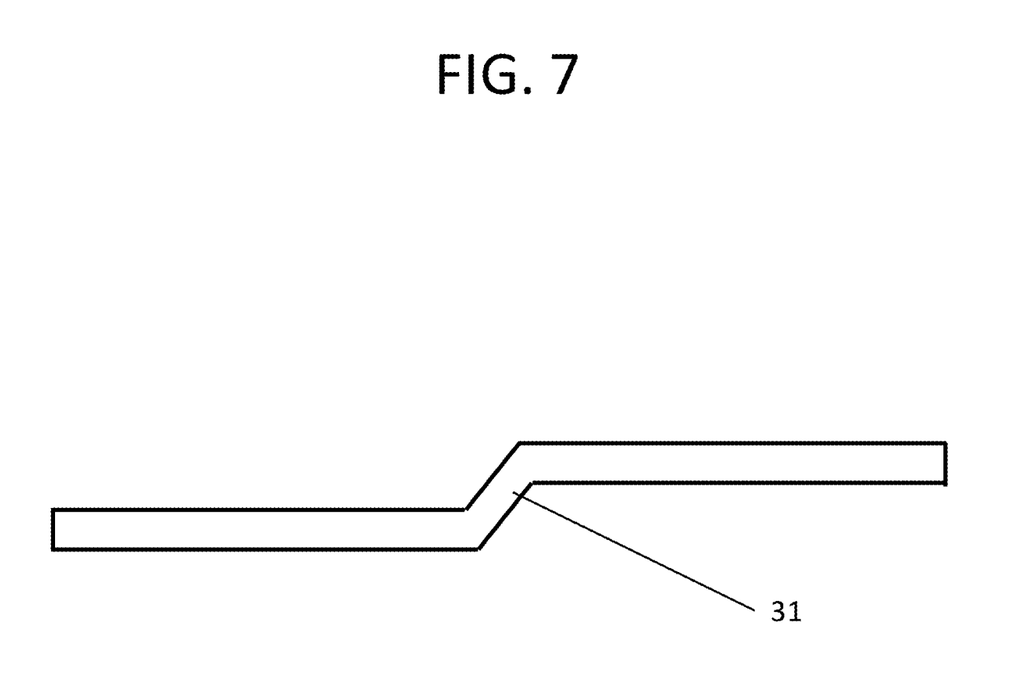
FIG. 7 illustrates a side view of a removable BITERS mounting latch.
Figure 8:
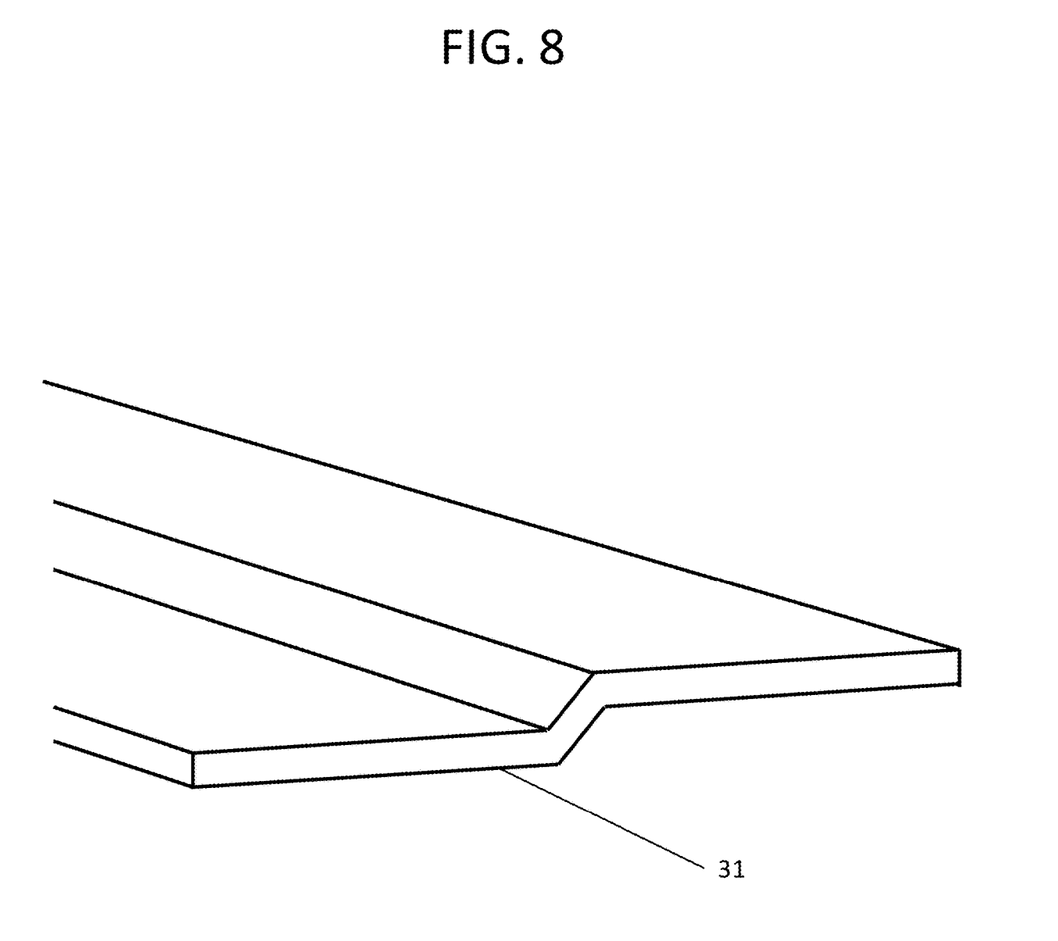
FIG. 8 illustrates a top isometric view of a removable BITERS mounting latch.
Figure 9:
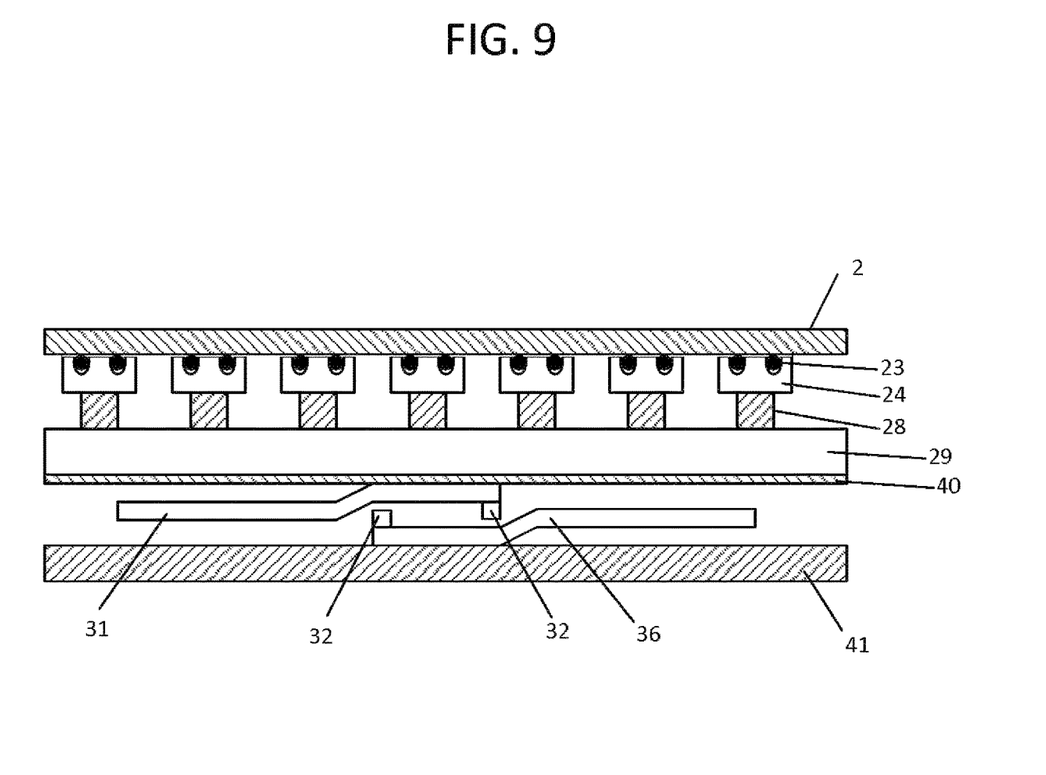
FIG. 9 illustrates a side view of the removable BITERS mounting latch with a mounting notch.

Each removable BITERS module 2 will contain a roof-attaching latch 31 securely mounted onto a vertical batten 29 comprising the plywood or fiberglass backing 40. The other portion 36 of the roof-attaching latch will be mounted onto a roof 41 at a designated attachment position. FIGS. 7-9 illustrate possible embodiments of the latch 31. FIG. 9 is another type of latch 31 which has a locking bend 32 on latch 31 and on latch 36, which would be recommended in high wind areas.

Figure 10:
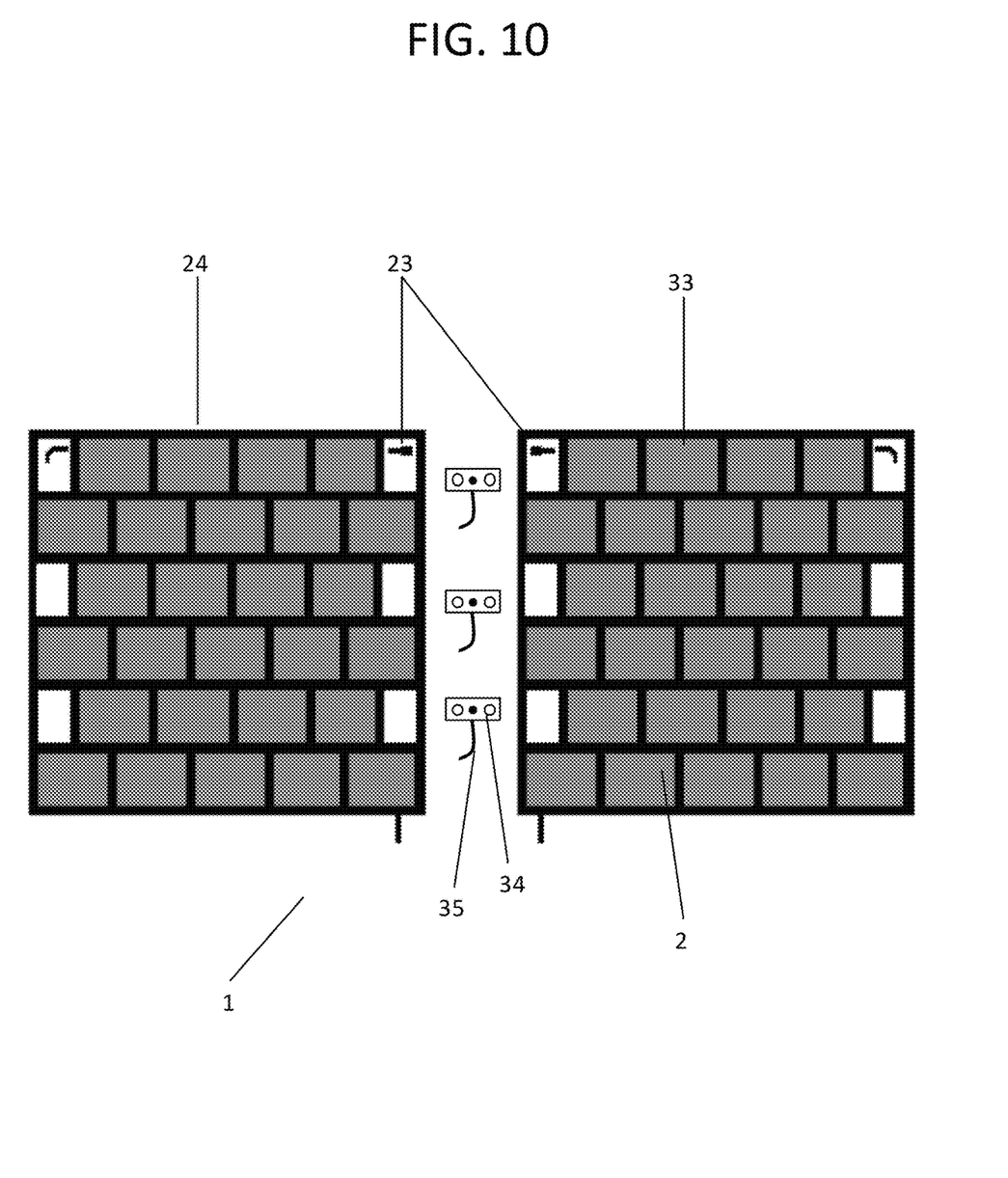
FIG. 10 illustrates a top view of the BITERS Sunslate Removable Modular System in an unconnected configuration.
Figure 11:
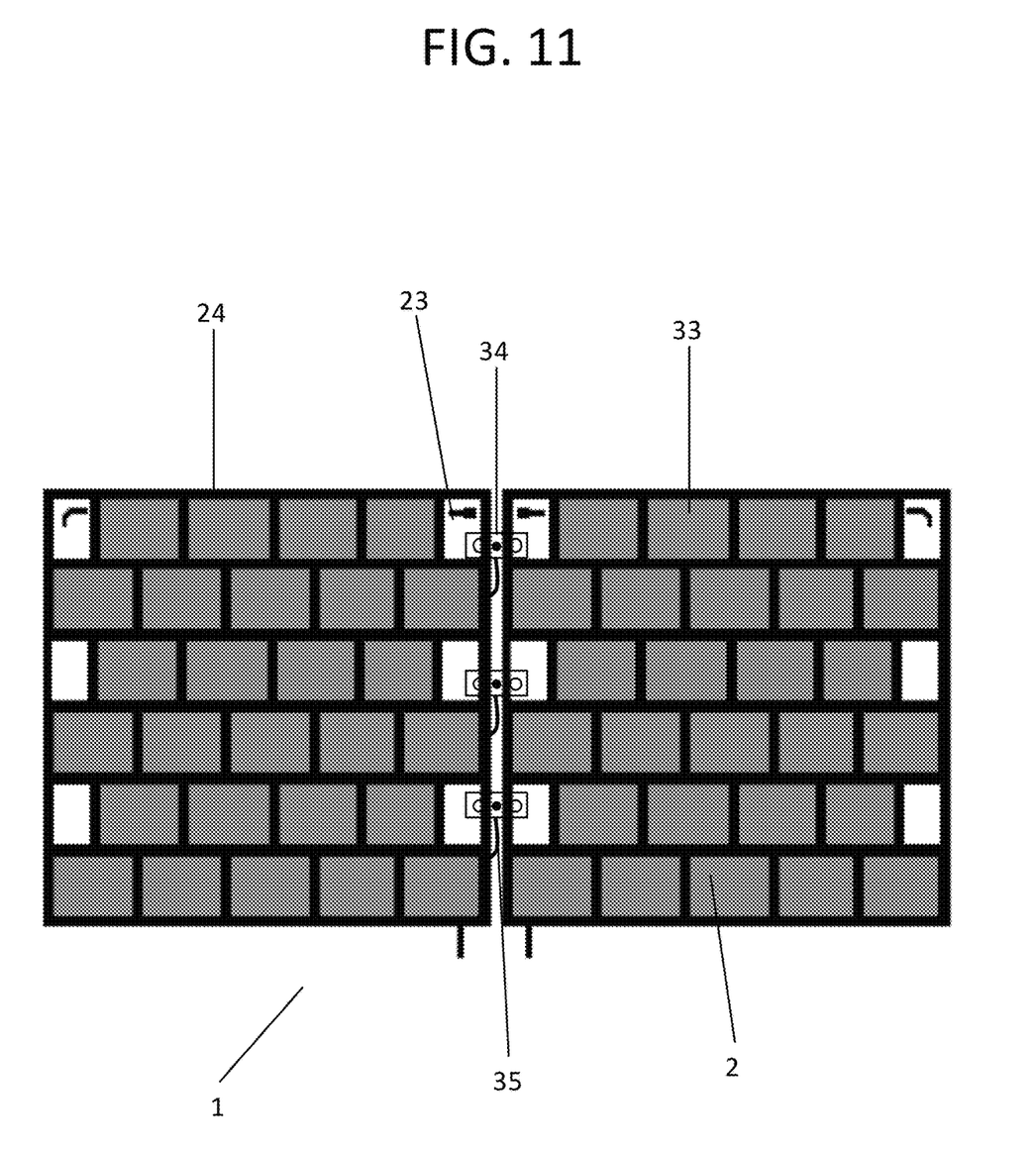
FIG. 11 illustrates a top view of the BITERS Sunslate Removable Modular System in a connected configuration.

As illustrated in FIGS. 10 and 11, dummy sun slate covers the Sunslates system 33 BITERS modules 2 to make them more aesthetically pleasing and to protect the connections between the modules from adverse weather conditions. The Sunslates system 33 BITERS modules 2 are connected with a plurality of metal fasteners 34 with hooks 35 that overlap each adjacent Sunslates system 33 BITERS modules 2 and connected them.

Figure 1:
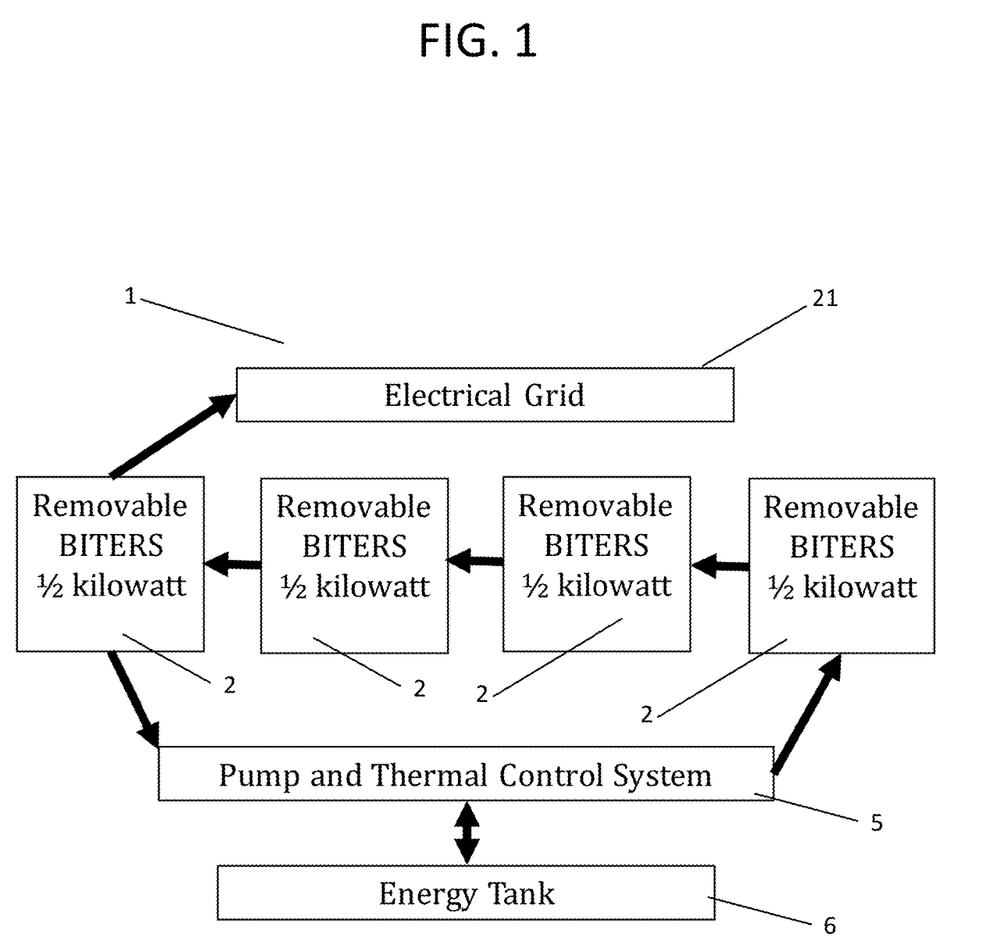
FIG. 1 illustrates a schematic of the removable BITERS system.
Figure 2:
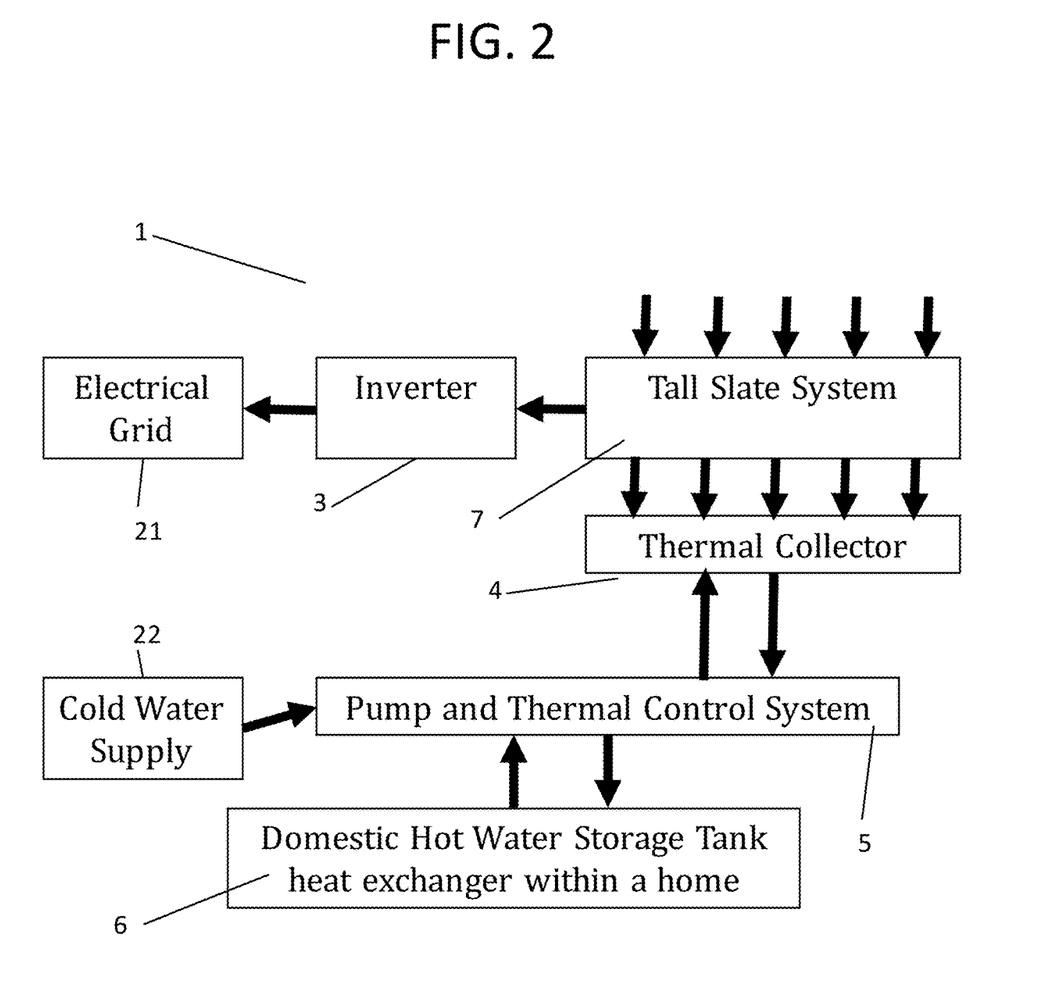
FIG. 2 illustrates a schematic of the BITERS system.
Figure 3:
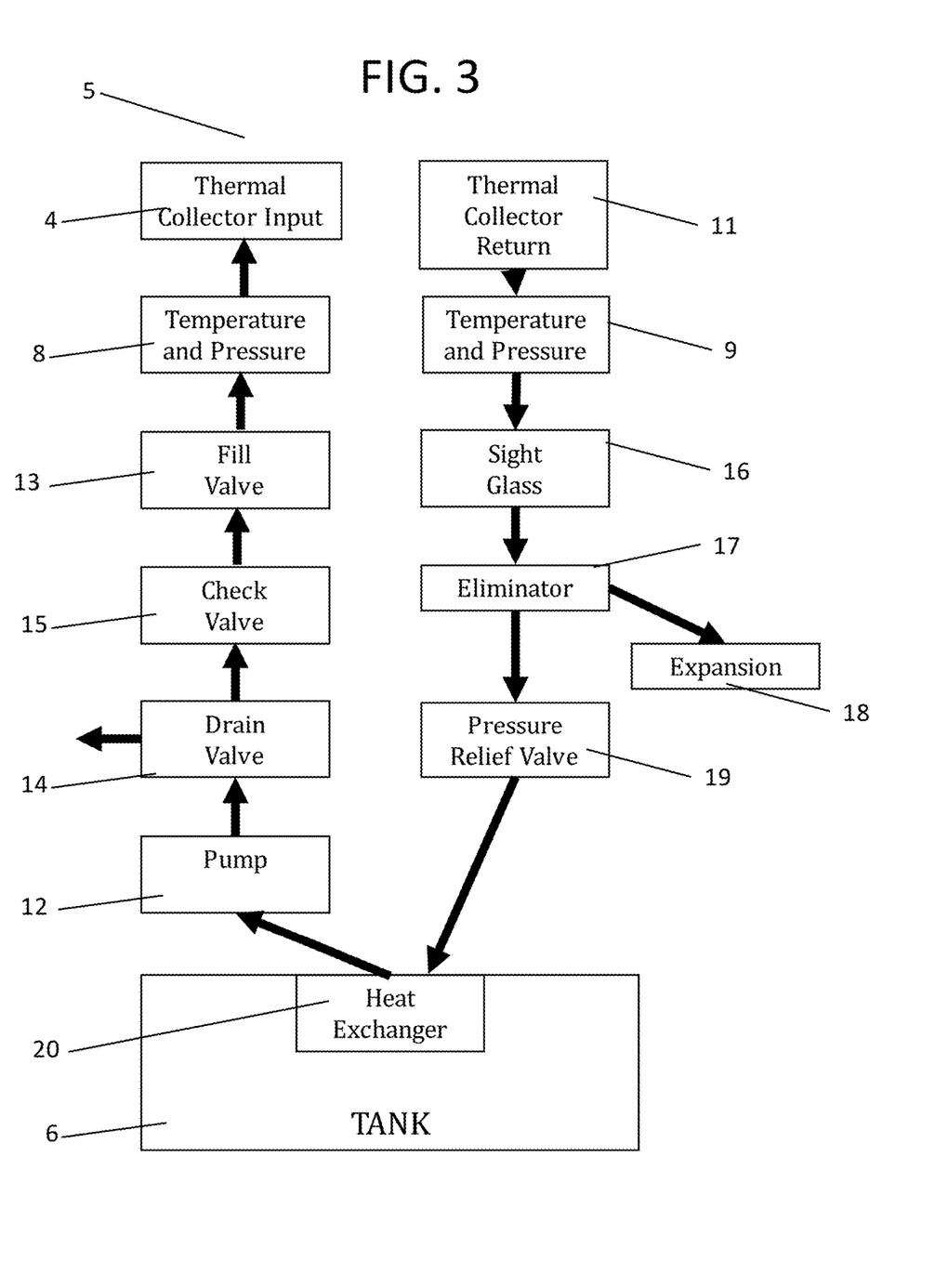
FIG. 3 illustrates a block diagram for the pump and thermal control system.
Figure 4:
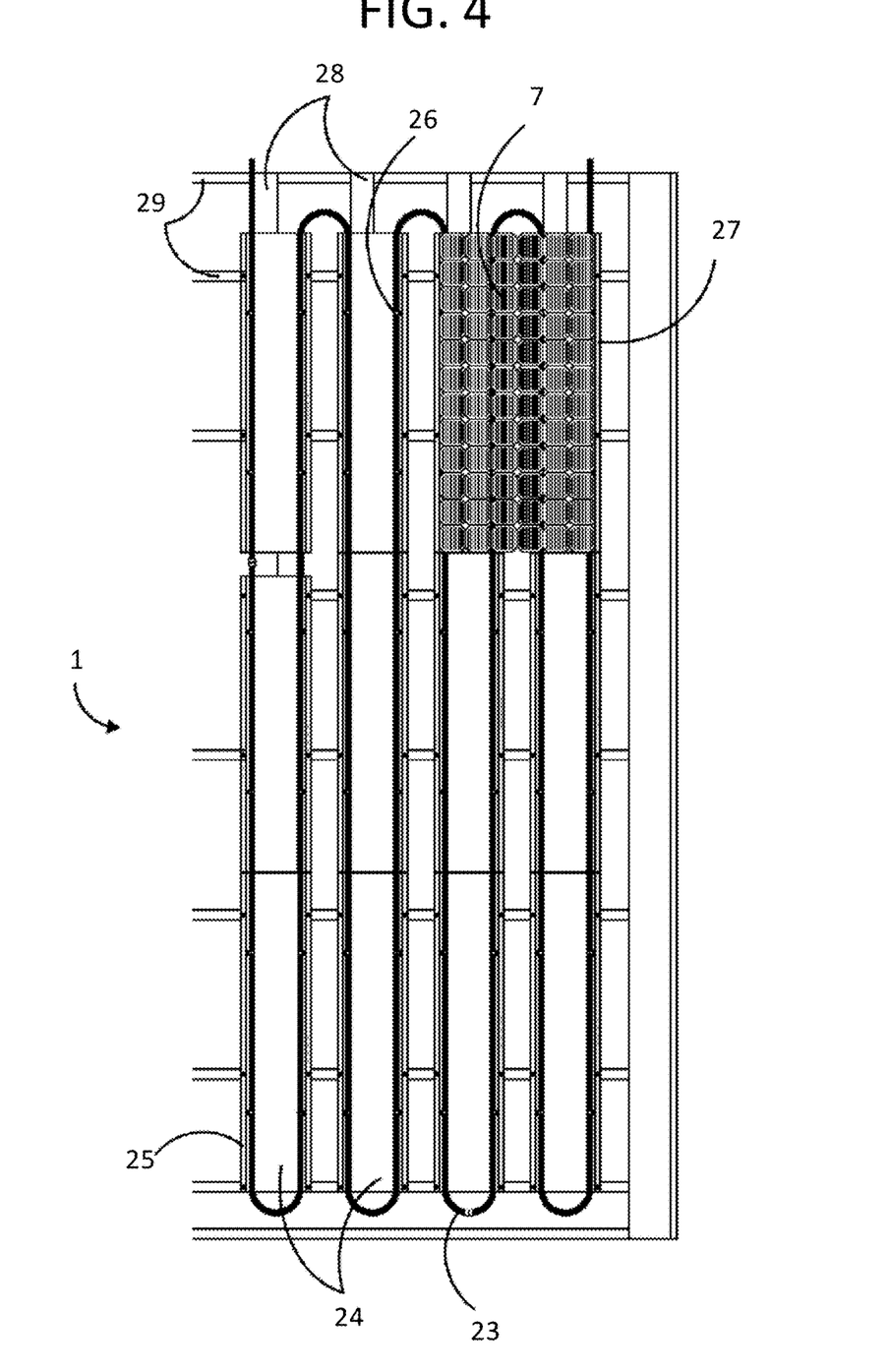
FIG. 4 illustrates a layout of a system.

As illustrated in FIG. 3, the Pump and Thermal Control System 5 is one removable unit for installation in the attic or basement, which consists of a first set of temperature and pressure gauges 8 attached to the thermal collector input 4, a second set of temperature and pressure gauges 9 is attached to the thermal collector return 11, a pump 12 to circulate the Pump and Thermal Control System 5, a fill valve 13 to help fill the System 5, a drain valve 14 which helps drain the System 5, a check valve 15 to make sure air is going on right direction, a flow sight glass 16 to ensure the liquid is flowing at the right direction, an air eliminator 17 to release the air from the System 5, an expansion tank 18 and a pressure relief valve 19 for safety. In variations of the subject invention, the Pump and Thermal Control System 5 or the pump 12 can be directly powered by the TallSlates™ 7 or Sunslates systems 33.

Each Pump and Thermal Control System 5 can support three to four TallSlates™ 7 or Sunslates systems 33.

Each removable BITERS module 2 may be mounted on a residential or commercial roof by a crane or a forklift. All the BITERS module 2 are installed on the roof and connected to each other before the TallSlates™ 7 or Sunslates systems 33 are made operational. The pluralities of metal batten 24, and horizontal 28 and vertical batten 29 are aligned between BITERS modules 2. Each BITERS module 2 may be attached to the roof with the roof-attaching latches 31 securely mounted onto the back side of each BITERS module 2 and attached to roof surface latches 36 that are installed on the roof at a designated attachment position.

Once the plurality of BITERS modules 2 are mounted on the roof, the micro-inverters 3 of each module 2 are connected to the electrical grid 21. In other embodiments of the subject invention, BITERS module 2 may be connected to a battery system (not shown).

After the micro-inverters 3 of each module 2 are connected to the electrical grid 21, the Pump and Thermal Control System 5 is installed in the attic or basement. To install the Pump and Thermal Control System 5, a user attaches the thermal collector 4 input 9 to the first set of temperature and pressure gauges 8, attaches the thermal collector 4 output 11 to the second set of temperature and pressure gauges 9, connects the pump 12 to a cold water supply 22, the drain valve 14, and the heat exchanger 20 to the tank 6. Once the pressures and temperatures are checked out, the Pump and Thermal Control System 5 is installed and is operational.

The system 1 can also be easily uninstalled and moved to a new roof structure. To remove, the Pump and Thermal Control System 5 is detached from the attic or basement. The thermal collector 4 input 9 is detached from the first set of temperature and pressure gauges 8, the thermal collector 4 output 11 is detached from the second set of temperature and pressure gauges 9, the pump 12 is detached from the cold water supply 22, the drain valve 14, and the heat exchanger 20 is detached from the tank 6. After Pump and Thermal Control System 5 is detached, the micro-inverters 3 of each module 2 are disconnected from the electrical grid 21.

Each removable BITERS module 2 may be removed from the residential or commercial roof by a crane or a forklift.

What is claimed is:

1. A modular, removable roofing installation system for optimally capturing solar thermal energy, the modular, removable roofing installation system comprising:
   a plurality of removable solar panel modules, each solar panel module comprising a plurality of slate modules mounted on a plurality of metal battens, a plurality of inverters for converting DC electricity fed from the plurality of slate, modules to AC electricity, a thermal tubing containing liquid mounted beneath the plurality of slate modules on the plurality of metal battens, wherein the plurality of metal battens are mounted on a plurality of horizontal battens that are mounted onto a plurality of vertical battens, wherein each solar panel module comprises a roof-attaching latch mounted to a backing of the plurality of vertical battens, wherein the roof-attaching latch couples to a corresponding roof surface latch mounted to a roof to removably attach each solar panel module to the roof;
   a plurality of metal fasteners, each metal fastener coupled to two adjacent removable solar panel modules of the plurality of removable solar panel modules;
   a pump and thermal control unit comprising a circulation pump that is operatively connected to the thermal tubing for circulating the liquid through the thermal tubing;
   a heat exchanger that is operatively connected to the thermal tubing for extracting the thermal energy, the heat exchanger being housed in a storage tank;
   a heat pump connected to the heat exchanger for maintaining the temperature of the liquid in the storage tank to a certain threshold temperature;
   whereby the plurality of slate modules and the thermal tubing operate simultaneously to generate electricity and domestic hot water respectively; and
   wherein the system may be removed and re-installed on a second roof by disconnecting the pump and thermal control unit, disconnecting the thermal tubing from the heat exchanger and the circulation pump, and removing the plurality of removable solar panel modules.

2. The modular, removable roofing installation system of claim 1 wherein each of the plurality of slate modules includes at least one photovoltaic cell.

3. The modular, removable roofing installation system of claim 1 wherein each of the plurality of slate modules is electrically connected in series to form a string.

4. The modular, removable roofing installation system of claim 3 wherein the plurality of inverters feed AC electricity to a utility grid.

5. The modular, removable roofing installation system of claim 1 wherein the plurality of metal battens collects the solar energy, converts into thermal energy and delivers to the liquid running in the thermal tubing.

6. The modular, removable roofing installation system of claim 1 wherein the circulation pump is powered by a separate photovoltaic panel.

7. The modular, removable roofing installation system of claim 1 wherein the heat exchanger extracts the thermal energy from the liquid in the thermal tubing resulting in heating up the domestic water supply and providing domestic hot water.

8. The modular, removable roofing installation system of claim 1 wherein the thermal tubing may be made of material selected from a group consisting of: copper, aluminum or cross-linked polyethylene (PEX).

9. The modular, removable roofing installation system of claim 1 wherein the liquid, in the thermal tubing may be selected from a group consisting of: water and glycol.

10. The modular, removable roofing installation system of claim 1 wherein the heat pump maintains the temperature of the liquid in the storage tank when the temperature goes below/above a certain level.

11. The modular, removable roofing installation system of claim 1 wherein the horizontal and vertical battens may be composed from a material selected from a group consisting of: wood and fiberglass.

12. The roofing installation system of claim 1 wherein the plurality of slate modules is cooled as the thermal energy is extracted by the heat exchanger, thereby making the plurality of slate modules operate at high efficiency in converting the solar energy to DC electricity.

13. A method of installing a modular, removable roofing installation system comprising:
   a. removably mounting a plurality of removable solar panel modules on a roof, each solar panel module comprising a plurality of slate modules mounted on a plurality of metal battens, a plurality of inverters for converting DC electricity fed from the plurality of slate modules to AC electricity, a thermal tubing containing liquid mounted beneath the plurality of slate modules on the plurality of metal battens, wherein the plurality of metal battens are mounted on a plurality of horizontal battens that are mounted onto a plurality of vertical battens, wherein each solar panel module comprises a roof-attaching latch mounted to a backing of the plurality of vertical battens, wherein the roof-attaching latch couples to a corresponding roof surface latch mounted to roof to removably attach each solar panel module to the roof;
   b. coupling each metal fastener of a plurality of metal fasteners to two adjacent removable solar panel modules of the plurality of removable solar panel modules;
   c. mounting a pump and thermal control unit comprising a circulation pump proximate to the solar panel modules;
   d. connecting the circulation pump to the thermal tubing for circulating the liquid through the thermal tubing;
   e. connecting a heat exchanger to the thermal tubing for extracting the thermal energy, the heat exchanger being housed in a storage tank;
   f. connecting a heat pump to the heat exchanger for maintaining the temperature of the liquid in the storage tank to a certain threshold temperature;
   g. electrically connecting each of the plurality of slate modules in series to form a string; and
   h. connecting the plurality of inverters to each string for converting the DC electricity from the plurality of slate modules to AC electricity.

14. The method of claim 13 wherein each of the plurality of slate modules includes at least one photovoltaic cell.

15. The method of claim 13 wherein the method of installing the roofing installation system is initiated at the bottom of the slope roof.

16. The method of claim 13 wherein the plurality of metal battens collects the solar energy and converts into thermal energy by running the liquid in the thermal tubing throughout the roof.

17. The method of claim 13 wherein the thermal energy is extracted by the heat exchanger resulting in heating up the domestic water supply and providing domestic hot water.

18. The method of claim 13 wherein the plurality of slate modules is cooled as the thermal energy is extracted by the heat exchanger, thereby making the plurality of slate modules operate at high efficiency in converting the solar energy to DC electricity.

19. The method of claim 13 wherein the heat pump maintains the temperature of the liquid in the storage tank when the temperature goes below/above a certain level.

* * * * *